United States Patent
Nishi et al.

(10) Patent No.: US 10,900,905 B2
(45) Date of Patent: Jan. 26, 2021

(54) PROBE MANUFACTURING METHOD AND PROBE

(71) Applicants: KYOTO UNIVERSITY, Kyoto (JP); HORIBA, Ltd., Kyoto (JP)

(72) Inventors: Masayuki Nishi, Kyoto (JP); Kazuyuki Hirao, Kyoto (JP); Daisuke Teranishi, Kyoto (JP); Hiroki Itasaka, Kyoto (JP); Nobuyuki Naka, Kyoto (JP); Yoshito Okuno, Kyoto (JP); Shinsuke Kashiwagi, Kyoto (JP); Yasushi Nakata, Kyoto (JP)

(73) Assignees: HORIBA, LTD., Kyoto (JP); KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 16/313,761

(22) PCT Filed: Jun. 30, 2017

(86) PCT No.: PCT/JP2017/024240
§ 371 (c)(1),
(2) Date: Dec. 27, 2018

(87) PCT Pub. No.: WO2018/003991
PCT Pub. Date: Jan. 4, 2018

(65) Prior Publication Data
US 2019/0170651 A1    Jun. 6, 2019

(30) Foreign Application Priority Data
Jun. 30, 2016 (JP) ............... 2016-130615

(51) Int. Cl.
*G01N 21/65* (2006.01)
*G01Q 60/42* (2010.01)
(Continued)

(52) U.S. Cl.
CPC ......... *G01N 21/658* (2013.01); *C23C 18/54* (2013.01); *G01N 21/65* (2013.01); *G01Q 60/40* (2013.01);
(Continued)

(58) Field of Classification Search
CPC ............... G01N 21/658; G01N 21/65; G01N 2021/656; C23C 18/54; G01Q 60/22;
(Continued)

(56) References Cited

U.S. PATENT DOCUMENTS

| 6,002,471 | A | 12/1999 | Quake |
| 2002/0178800 | A1* | 12/2002 | Hasegawa ............ B82Y 35/00 73/105 |

(Continued)

FOREIGN PATENT DOCUMENTS

| CN | 101299457 A | 11/2008 |
| CN | 103741122 A | 4/2014 |

(Continued)

OTHER PUBLICATIONS

EPO, Extended European Search Report for the corresponding European patent application No. 17820345.1, dated Jan. 28, 2020.

(Continued)

*Primary Examiner* — Suman K Nath
(74) *Attorney, Agent, or Firm* — Lucas & Mercanti, LLP (57) ABSTRACT

A needle-shaped body protrudes from a cantilever made of Si. Furthermore, the rear face of the cantilever is coated with aluminum (first metal) having a Fermi level higher than that of Si. The cantilever is dipped into an aqueous silver nitride solution containing the ions of Ag serving as a second metal. The electrons of Si flow out to the aqueous silver nitride solution due to the existence of the aluminum, and Ag nanostructures are precipitated at the tip end of the needle-shaped body. A probe for tip-enhanced Raman scattering in which the Ag nanostructures are fixed to the tip end of the needle-shaped body is manufactured. The sizes and shapes of the Ag nanostructures can be controlled properly by adjusting the concentration of the aqueous silver nitride (Continued)

solution and the time during which the cantilever is dipped into the aqueous silver nitride solution.

15 Claims, 8 Drawing Sheets

(51) Int. Cl.
  *G01Q 70/18*  (2010.01)
  *C23C 18/54*  (2006.01)
  *G01Q 60/40*  (2010.01)
(52) U.S. Cl.
  CPC ............. *G01Q 60/42* (2013.01); *G01Q 70/18* (2013.01); *G01N 2021/656* (2013.01)
(58) Field of Classification Search
  CPC ........ G01Q 60/40; G01Q 60/42; G01Q 70/14; G01Q 70/18
  See application file for complete search history.

(56) References Cited

U.S. PATENT DOCUMENTS

2006/0043276 A1  3/2006  Saito et al.
2016/0024675 A1  1/2016  Hiraoka et al.

FOREIGN PATENT DOCUMENTS

| CN | 105274584 A | 1/2016 |
| JP | H09-145726 A | 6/1997 |
| JP | 2006071448 A | 3/2006 |
| JP | 2006153831 A | 6/2006 |
| JP | 2009156602 A | 7/2009 |
| WO | 2010133217 A1 | 11/2010 |

OTHER PUBLICATIONS

Wang, et al., "Controllable method for the preparation of metalized probes for efficient scanning near-field optical Raman microscopy," Applied Physics Letters, Jun. 23, 2005, pp. 263111-1-263111-3, vol. 86, No. 26, AIP Publishing LLC, US.
P.R. Brejna, et al; Electroless deposition of silver onto silicon as a method of preparation of reproducible . . . ; Applied Spectroscopy; vol. 64; No. 5; 2010; pp. 493-499.
Y. Fukuhara, et al; Optimized measurement of tapping-AFM based tip-enhanced raman spectroscopy; Extended abstracts of the 61st JSAP Spring Meeting (2014 Spring Aoyama Gakuin University); 2014; p. 06-284.
International Search Report dated Sep. 26, 2017 for PCT/JP2017/024240 and English translation.
CNIPA, Office Action issued in the Chinese Patent Application No. 201780038786.8, dated Nov. 4, 2020, with English translation.

\* cited by examiner

PROBE MANUFACTURING METHOD AND PROBE

CROSS REFERENCE TO RELATED APPLICATION

This Application is a 371 of PCT/JP2017/024240 filed on Jun. 30, 2017, which, in turn, claimed the priority of Japanese Patent Application No. 2016-130615 filed on Jun. 30, 2016, both applications are incorporated herein by reference.

FIELD

The present invention relates to a probe for measuring tip-enhanced Raman scattering and to a probe manufacturing method.

BACKGROUND

Tip-enhanced Raman scattering is a method in which the metal-made tip end of a probe is brought close to or made contact with a sample, light is applied to the tip end of the probe, and enhanced Raman scattering light is made to be generated from the sample. Localized plasmons are induced by applying light to the metal-made tip end of the probe, a locally enhanced electric field is generated, and Raman scattering light is enhanced. Raman spectroscopic analysis for a minute area of the sample is made possible by tip-enhanced Raman scattering.

A metal probe for STM (Scanning Tunneling Microscope) or a probe obtained by depositing a metal on a probe for AFM (Atomic Force Microscope) has been used conventionally as the probe. Japanese Patent Application Laid-Open Publication No. 2009-156602 discloses a probe that is coated with silver by vapor deposition.

SUMMARY

The enhancement degree of Raman scattering light due to tip-enhanced Raman scattering depends on the sizes and shapes of metallic nanostructures formed at the tip end of a probe. In the case of the conventional metal vapor deposition method, since the probe is entirely coated with a metal, it is difficult to make the sizes and shapes of the metal nanostructures formed at the tip end of the probe to the sizes and shapes suited for the wavelengths of various kinds of excitation light for Raman spectroscopy. Furthermore, the conventional method has a problem of requiring large facilities, such as a vacuum chamber and a vacuum pump, to perform metal vapor deposition.

The present disclosure is made in consideration of the above-mentioned circumstances, and objects of the present disclosure is to provide a probe manufacturing method capable of simplifying the manufacturing of a probe and capable of properly controlling the sizes and shapes of metal nanostructures and to provide a probe.

A method for manufacturing a probe protruding from a cantilever according to an aspect of the present disclosure is characterized by comprising the step of: dipping the cantilever made of a semiconductor, the cantilever having a part coated with a first metal having a Fermi level higher than that of the semiconductor and having another part from which a needle-shaped body protrudes, into a solution containing ions of a second metal, to manufacture a probe in which structures of the second metal are precipitated at a tip end of the needle-shaped body.

In the present disclosure, the cantilever, part of which is coated with the first metal having a Fermi level higher than that of the semiconductor serving as the material thereof, is dipped into the solution containing the ions of the second metal. The needle-shaped body protrudes from the cantilever. The electrons of the semiconductor effectively flow out to the solution due to the presence of the first metal, and the structures of the second metal are precipitated at the tip end of the needle-shaped body. The probe for tip-enhanced Raman scattering in which the metal structures are fixed to the tip end of the needle-shaped body is manufactured.

A method for manufacturing a probe protruding from a cantilever according to an aspect of the present disclosure is characterized by comprising the step of: dipping the cantilever made of a semiconductor, the cantilever having a part from which a needle-shaped body protrudes, into a solution containing the ions of a second metal and having a Fermi level lower than that of the semiconductor, thereby supplying electrons from the needle-shaped body to the ions of the second metal in the solution and manufacturing a probe in which structures of the second metal are precipitated at a tip end of the needle-shaped body.

In the present disclosure, the cantilever made of the semiconductor is dipped into the solution containing the ions of the second metal. The needle-shaped body protrudes from part of the cantilever. Electrons flow out from the tip end of the needle-shaped body to the solution, the ions of the second metal are reduced, and the structures of the second metal are precipitated. As a result, the probe for tip-enhanced Raman scattering in which the metal structures are fixed to the tip end of the needle-shaped body is manufactured.

In the method for manufacturing the probe according to an aspect of the present disclosure, part of the cantilever is coated with a metal coat made of a first metal.

In the present disclosure, the cantilever, part of which is coated with the metal coat made of the first metal, is dipped into the solution containing the ions of the second metal. Electrons flow from the metal coat to the cantilever, electrons flow out from the tip end of the needle-shaped body to the solution, and the structures of the second metal are precipitated at the tip end of the needle-shaped body.

In the method for manufacturing the probe according to an aspect of the present disclosure, the first metal is a metal having an ionization tendency larger than that of the second metal.

In the present disclosure, since the ionization tendency of the first metal is larger than the ionization tendency of the second metal, the first metal tends to be oxidized, and the ions of the second metal tend to be reduced. When the first metal is oxidized, electrons flow from the metal coat to the cantilever, electrons flow out from the tip end of the needle-shaped body to the solution, and the ions of the second metal are reduced. Hence, the structures of the second metal are precipitated at the tip end of the needle-shaped body.

In the method for manufacturing the probe according to an aspect of the present disclosure, the metal coat makes ohmic contact with the cantilever.

In the present disclosure, since the metal coat makes ohmic contact with the cantilever made of an n-type semiconductor, electrons are likely to flow from the metal coat to the cantilever. Electrons flow from the metal coat to the cantilever, and electrons flow out from the tip end of the needle-shaped body to the solution, whereby the structures of the second metal are precipitated at the tip end of the needle-shaped body.

In the method for manufacturing the probe according to an aspect of the present disclosure, the first metal is aluminum, chromium, iron, titanium, zirconium, magnesium, manganese, zinc, nickel, or tin.

In the present disclosure, the first metal is aluminum, chromium, iron, titanium, zirconium, magnesium, manganese, zinc, nickel, or tin. Electrons are supplied from the metal coat to the needle-shaped body in the case that part of the cantilever is coated with the metal coat made of these metals.

In the method for manufacturing the probe according to an aspect of the present disclosure, after the cantilever is dipped into the solution, the dipping is interrupted, the needle-shaped body is dried, and the cantilever is dipped into the solution again.

In the present disclosure, after the cantilever is dipped into the solution, the needle-shaped body is dried once, and the cantilever is dipped into the solution again. The seed of the metal structures is formed by the first dipping, and the metal structures are made to grow further by the second dipping.

In the method for manufacturing the probe according to an aspect of the present disclosure, the solution is a solution containing ions of silver, gold, platinum, iridium, palladium, copper or bismuth.

In the present disclosure, the solution contains the ions of silver, gold, platinum, iridium, palladium, copper or bismuth. Hence, the metal structures of silver, gold, platinum, iridium, palladium, copper or bismuth are precipitated at the tip end of the needle-shaped body. Tip-enhanced Raman scattering can be measured using the probe containing these metal structures.

The method for manufacturing the probe according to an aspect of the present disclosure is characterized by further comprising the step of: removing part of the structures contained in a degraded probe, reducing the structures or removing substances adhered to the structures.

In the present disclosure, the probe is reconditioned by removing degraded part of the metal structures contained in the degraded probe or by reducing the degraded part.

A probe protruding from a cantilever according to an aspect of the present disclosure is characterized by comprising: a needle-shaped body protruding from a part of the cantilever, wherein the cantilever is made of a semiconductor and another part of the cantilever is coated with a first metal having a Fermi level higher than that of the semiconductor; and structures of a second metal precipitated at a tip end of the needle-shaped body by dipping the cantilever into a solution containing the ions of the second metal.

A probe protruding from a cantilever according to an aspect of the present disclosure is characterized by comprising: a needle-shaped body protruding from a part of the cantilever made of a semiconductor; and structures of a second metal precipitated at a tip end of the needle-shaped body by dipping the cantilever into a solution containing the ions of the second metal.

In the present disclosure, the probe has a configuration in which the metal structures are precipitated at the tip end of the needle-shaped body. With the manufacturing method according to the present disclosure, the metal structures having sizes and shapes suited for measuring tip-enhanced Raman scattering are provided.

With an aspect of the present disclosure, since the sizes and shapes of the metal structures to be formed at the time when the probe is manufactured can be controlled freely by adjusting the concentration of the solution into which the cantilever is dipped or by adjusting the dipping time, metal structures having sizes and shapes suited for various kinds of excitation light for Raman spectroscopy can be formed. Hence, the aspect of the present disclosure has excellent advantages, for example, when tip-enhanced Raman scattering is measured using the probe, effective enhancement of Raman scattering light is made possible.

The above and further objects and features will more fully be apparent from the following detailed description with accompanying drawings.

DETAILED DESCRIPTION

The present disclosure will be described specifically on the basis of the drawings showing embodiments thereof.

Embodiment 1

Figure 1:
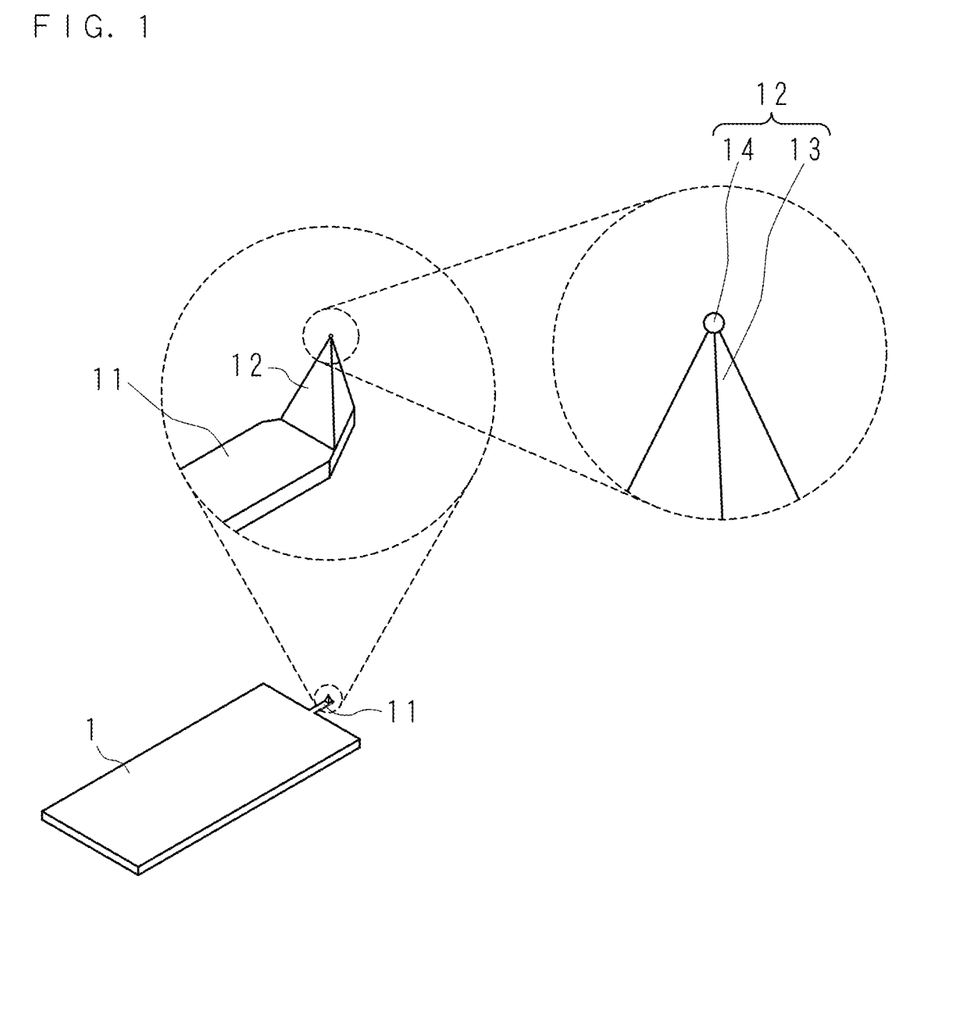
FIG. 1 is a schematic view showing a probe for tip-enhanced Raman scattering.

FIG. 1 is a schematic view showing a probe for tip-enhanced Raman scattering. A probe holder 1 is made of Si (silicon) and is formed in a flat plate shape. A cantilever 11 is provided at one end of the probe holder 1. The cantilever 11 is shown enlarged in the figure. A probe 12 is provided at the end section of the cantilever 11. Furthermore, the tip end portion of the probe 12 is shown enlarged in the figure. The probe 12 includes a needle-shaped body 13 protruding from the cantilever 11 and an aggregate 14 of metallic structures fixed to the tip end of the needle-shaped body 13. The cantilever 11 has two faces having a front-rear relationship, and the needle-shaped body 13 protrudes from one face of the cantilever 11. The other face of the cantilever 11, that is, the face on the opposite side of the face that is provided with the probe 12, is hereafter referred to as the rear face. Moreover, the cantilever 11 is assumed to include the needle-shaped body 13. The needle-shaped body 13 is made of Si, has a pyramid shape and is integrated with the cantilever 11 by Si. For example, the cantilever 11 including the needle-shaped body 13 is formed of a single crystal of Si. The aggregate 14 of metallic structures is formed by aggregating a plurality of metallic structures. This embodiment shows an example in which the metallic structures are Ag nanostructures formed of nano-sized Ag (silver). The size of each of the Ag nanostructures is a few nm or more and less than 1 μm, and the size of the aggregate 14 of the Ag nanostructures is a few μm or less.

Figure 2:
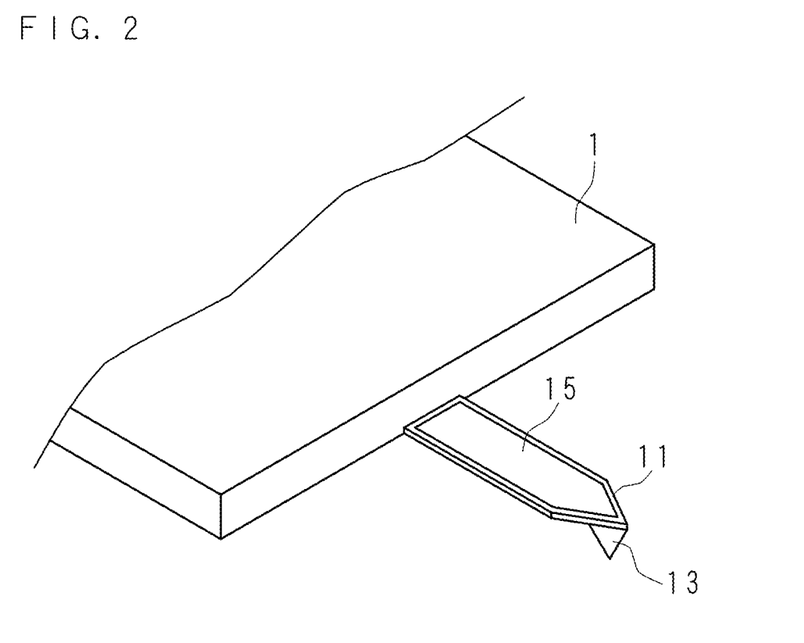
FIG. 2 is a schematic perspective view showing an AFM probe.

The probe 12 for tip-enhanced Raman scattering is manufactured from an AFM probe. FIG. 2 is a schematic perspective view showing the AFM probe. The needle-shaped body 13 protrudes from the end section of the cantilever 11 provided at one end of the probe holder 1. Furthermore, a metal coat 15 is formed on the rear face of the cantilever 11. The metal coat 15 is obtained by coating the rear face of the cantilever 11 with aluminum. In other words, the portion where the metal coat 15 is formed is located on the face different from the face on which the needle-shaped body 13 is provided. The aluminum constituting the metal coat 15 corresponds to a first metal.

Figure 3A:
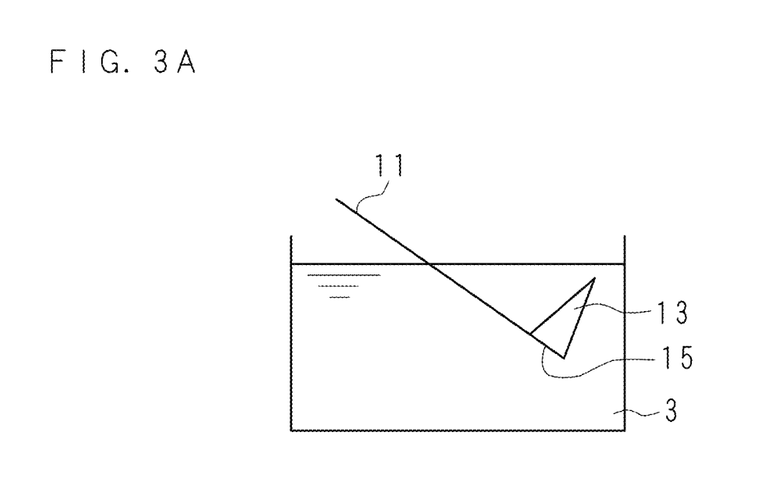
FIG. 3A is a schematic view showing a method for manufacturing a probe for tip-enhanced Raman scattering according to Embodiment 1.
Figure 3B:
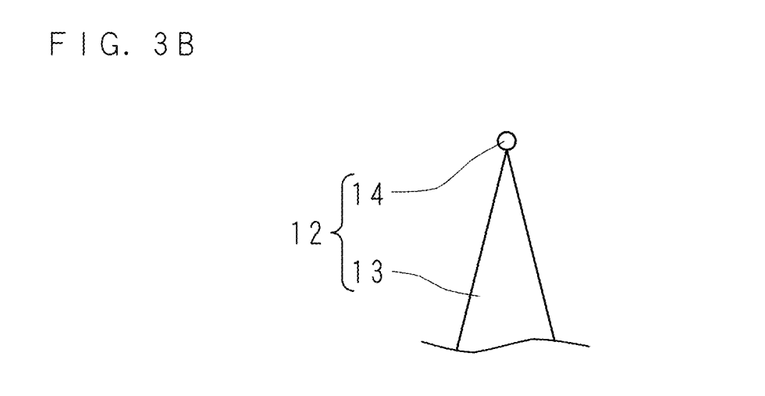
FIG. 3B is a schematic view showing a method for manufacturing a probe for tip-enhanced Raman scattering according to Embodiment 1.
Figure 3C:
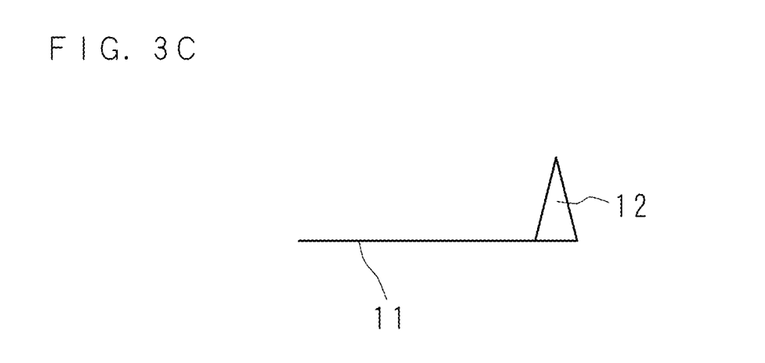
FIG. 3C is a schematic view showing a method for manufacturing a probe for tip-enhanced Raman scattering according to Embodiment 1.

FIGS. 3A, 3B and 3C are schematic views showing a method for manufacturing the probe 12 for tip-enhanced Raman scattering according to Embodiment 1. As shown in FIG. 3A, the cantilever 11, from the end section of which the needle-shaped body 13 protrudes, is dipped into an aqueous silver nitrate solution 3. The aqueous silver nitrate solution 3 is a solution containing Ag ions. The Ag ions contained in the aqueous silver nitrate solution 3 correspond to the ions of a second metal. A reducing agent for reducing metal ions is not contained in the aqueous silver nitrate solution 3. At this time, the cantilever 11 is dipped into the aqueous silver nitrate solution 3 so that the needle-shaped body 13 and at least part of the metal coat 15 formed on the rear face of the cantilever 11 are dipped into the aqueous silver nitrate solution 3. Furthermore, it is desirable that the cantilever 11 should be dipped into the aqueous silver nitrate solution 3 so that the tip end of the needle-shaped body 13 is directed upward. Ag is precipitated and Ag nanostructures are made to grow at the tip end of the needle-shaped body 13 by dipping the cantilever 11 into the aqueous silver nitrate solution 3.

The Fermi level of the aluminum constituting the metal coat 15 is higher than the Fermi level of Si. The electrons inside the aluminum enter the Si constituting the cantilever 11. As the electrons enter from the aluminum, the electrons of the Si pass through the natural oxide film of the Si and flow out into the aqueous silver nitrate solution 3. The Ag ions in the aqueous silver nitrate solution 3 are reduced by the electrons having flowed out, and Ag nanostructures are precipitated. Since the electrons are most likely to flow out from the tip end of the needle-shaped body 13, the electrons of the Si mainly flow out from the tip end of the needle-shaped body 13 into the aqueous silver nitrate solution 3. Hence, the Ag nanostructures are precipitated and made to grow at the tip end of the needle-shaped body 13. As the natural oxide film of the Si is thinner, the electrons are likely to flow out from the tip end of the needle-shaped body 13, and the Ag nanostructures are likely to be precipitated. Ideally, in the state in which the natural oxide film of Si does not exist, the electrons are more likely to flow out, and the Ag nanostructures are more likely to be precipitated. Moreover, as the curvature of the tip end of the needle-shaped body 13 is larger, the electrons are more likely to flow out from the tip end of the needle-shaped body 13.

After the cantilever 11 is dipped into the aqueous silver nitride solution 3 for an appropriate period of time, the cantilever 11 is taken out from the aqueous silver nitride solution 3 and washed. The washing, however, is not essential. As shown in FIG. 3B, the aggregate 14 of the Ag nanostructures is formed at the tip end of the needle-shaped body 13. In addition to the tip end of the needle-shaped body 13, the Ag nanostructures is also precipitated sometimes along the ridge lines of the cantilever 11 including the needle-shaped body 13. The size and shape of the aggregate 14 of the Ag nanostructures can be controlled, for example, by adjusting the concentration of the aqueous silver nitride solution 3 or the time during which the cantilever 11 is dipped into the aqueous silver nitride solution 3. As shown in FIGS. 3B and 3C, the probe 12 for tip-enhanced Raman scattering in which the aggregate 14 of the Ag nanostructures is fixed to the tip end of the needle-shaped body 13 protruding from the cantilever 11 is manufactured as described above.

Figure 4:
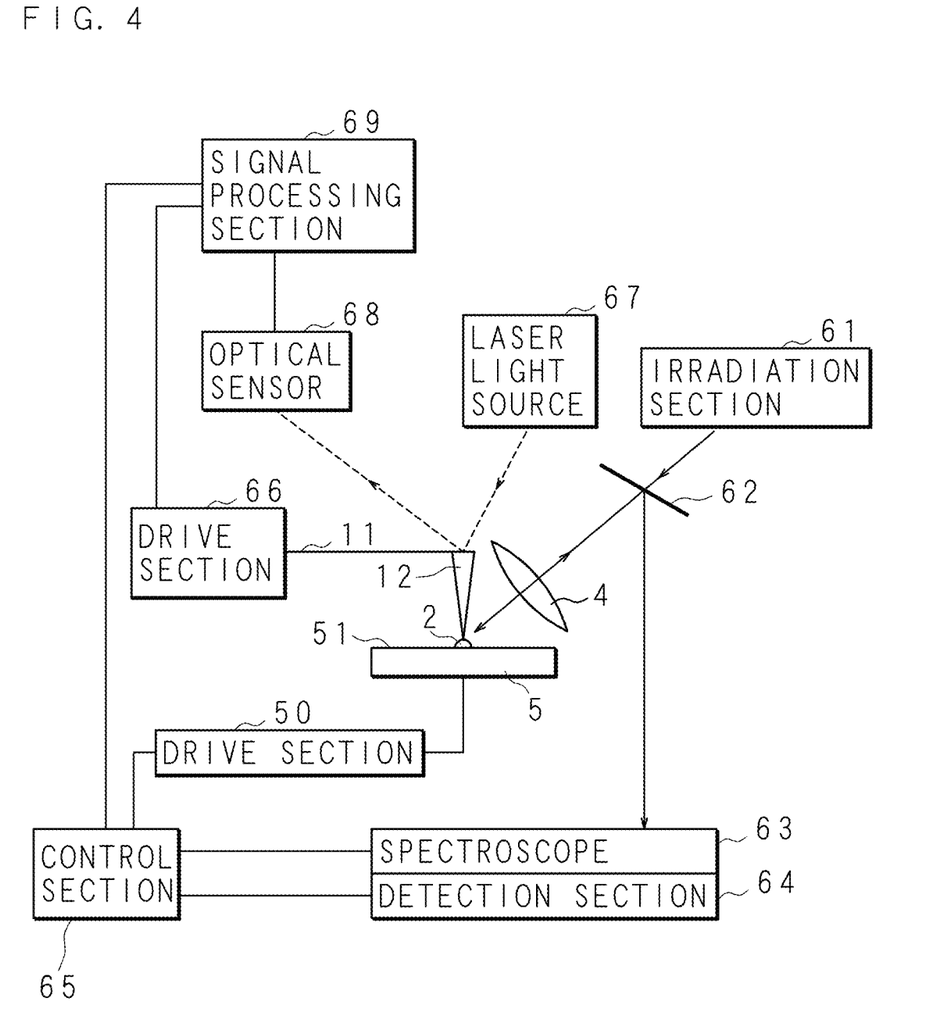
FIG. 4 is a block diagram showing a configuration of a Raman scattering measurement apparatus.

FIG. 4 is a block diagram showing a configuration of a Raman scattering measurement apparatus. The Raman scattering measurement apparatus is equipped with a sample stand 5 on which a sample 2 is placed, the cantilever 11, the probe 12, an irradiation section 61 for applying laser light, and a lens 4 for converging the laser light from the irradiation section 61 to the tip end section of the probe 12 that is brought close to or made contact with the sample 2. The probe 12 is provided at the end section of the cantilever 11. The sample stand 5 has a sample placement face 51. Furthermore, the sample 2 can have any shape such as a flat plate, although the sample 2 having a granular shape is shown in FIG. 4.

The Raman scattering measurement apparatus is further equipped with a drive section 66 for moving the cantilever 11, a laser light source 67, an optical sensor 68, a signal processing section 69, and a control section 65. The drive section 66 brings the probe 12 close to the sample 2 placed on the sample placement face 51 by moving the cantilever 11. The laser light source 67 applies laser light to the rear face of the cantilever 11. The laser light is reflected by the metal coat 15 provided on the rear face of the cantilever 11. The optical sensor 68 detects the reflected laser light and outputs a signal indicating the result of the detection to the signal processing section 69. In FIG. 4, the laser light is indicated by dashed arrows. In the case that the tip end section of the probe 12 is brought close to or made contact with the sample 2, the cantilever 11 is bent by an atomic force, the position at which the laser light is detected by the optical sensor 68 is deviated, and the signal processing section 69 detects the bending of the cantilever 11. The change in the bending amount of the cantilever 11 corresponds to the change in the distance between the probe 12 and the surface of the sample 2. The signal processing section 69 controls the operation of the drive section 66 so that the bending of the cantilever 11 becomes constant. The control section 65 controls the operation of the signal processing section 69, thereby controlling the movement of the probe 12. The Raman scattering measurement apparatus may be configured to measure the current flowing between the probe 12 and the sample 2 and to control the movement of the probe 12 on the basis of the measured current.

The Raman scattering measurement apparatus is further equipped with a beam splitter 62, a spectroscope 63, a detection section 64 for detecting light, and a drive section 50 for moving the sample stand 5 in the up-down direction or the left-right direction. The laser light applied by the irradiation section 61 passes through the beam splitter 62, is converged by the lens 4, and is applied to the tip end section of the probe 12 that is brought close to or made contact with the sample 2. The aggregate 14 of the Ag nanostructures formed at the tip end of the needle-shaped body 13 is included at the tip end section of the probe 12. The state of being brought close to is herein the state in which the aggregate 14 of the Ag nanostructures has approached the surface of the sample 2 to the distance to the extent that localized plasmons are induced on the surface of the sample 2 by the applied light, that a locally enhanced electric field is generated, and that tip-enhanced Raman scattering in which Raman scattering light is enhanced is generated. Tip-enhanced Raman scattering is generated at the portion on the sample 2 to which the tip end section of the probe 12 is brought close or with which the tip end section of the probe 12 is made contact and to which the laser light is applied. The generated Raman scattering light is condensed by the lens 4, is reflected by the beam splitter 62, and enters the spectroscope 63. In FIG. 4, the laser light applied to the sample 2 and the Raman scattering light are indicated by solid arrows. The Raman scattering measurement apparatus is equipped with optical systems composed of numerous optical components, such as mirrors, lenses and filters, for guiding, condensing and separating the laser light and the Raman scattering light. In FIG. 4, optical systems other than the lens 4 and the beam splitter 62 are not shown. The spectroscope 63 disperses the incident Raman scattering light. The detection section 64 detects the light of various wavelengths dispersed by the spectroscope 63 and outputs signals corresponding to the detection intensity of the light of various wavelengths to the control section 65. The control section 65 controls the wavelengths of the light dispersed by the spectroscope 63 and the signals output from the detection section 64 are input to the control section 65, whereby the control section 65 generates a Raman spectrum on the basis of the wavelengths of the dispersed light and the detection intensity of the light indicated by the input signals. In this way, Tip-enhanced Raman scattering is measured. The control section 65 controls the operation of the drive section 50 to moves the sample stand 5, thereby making it possible to measure Tip-enhanced Raman scattering at various portions on the sample stand 5.

As described above in detail, with this embodiment, the probe 12 in which the aggregate 14 of the Ag nanostructures is fixed to the tip end of the needle-shaped body 13 is manufactured by dipping the cantilever 11, from which the needle-shaped body 13 protrudes and on the rear face of which the metal coat 15 is formed, into the aqueous silver nitride solution 3. Since the Ag nanostructures are precipitated at the tip end of the needle-shaped body 13 by simply dipping the cantilever 11 into the aqueous silver nitride solution 3, the probe 12 for tip-enhanced Raman scattering can be manufactured with little labor without requiring large facilities for vacuum deposition. The size and shape of the aggregate 14 of the Ag nanostructures can be controlled by adjusting the concentration of the aqueous silver nitride solution 3 into which the cantilever 11 is dipped or by adjusting the dipping time. Hence, the size and shape of the aggregate 14 of the Ag nanostructures to be formed on the probe 12 can be controlled freely, whereby it is possible to form the aggregate 14 suited for the wavelengths of the laser light for Raman scattering. As a result, when tip-enhanced Raman scattering is measured using the probe 12, effective enhancement of Raman scattering light is made possible. Furthermore, the probe 12 capable of obtaining the desired degree of enhancement at the time when tip-enhanced Raman scattering is measured can be manufactured by controlling the size and shape of the aggregate 14 of the Ag nanostructures.

Moreover, with this embodiment, since a reducing agent for reducing metal ions is not contained in the aqueous silver nitride solution 3, the entire face of the needle-shaped body 13 is not coated with Ag, and the aggregate 14 of the Ag nanostructures is concentratedly formed mainly at the tip end of the needle-shaped body 13.

Although the example in which the metal coat 15 formed on the cantilever 11 is made of aluminum is described in this embodiment, the first metal constituting the metal coat 15 may be metals other than aluminum, provided that the metals have Fermi levels higher than that of Si. For example, the first metal may be chromium, iron, titanium, zirconium, magnesium, manganese, zinc, nickel, or tin. Furthermore, the cantilever 11 including the needle-shaped body 13 may be made of Si having a water resistant film such as a natural oxide film on the surface, or may partially contains Si having no water resistant film. Moreover, the cantilever 11 may also be made of a semiconductor having a water resistant film such as a natural oxide film on the surface, other than Si. In this case, the first metal is a metal having a Fermi level higher than that of the semiconductor constituting the cantilever 11. What's more, the metal coat 15 made of the first metal may be formed at portions other than the rear face of the cantilever 11.

Furthermore, although the mode in which the cantilever 11 is dipped into the aqueous silver nitride solution 3 has been described in this embodiment, the solution containing Ag ions may be solutions other than the aqueous silver nitride solution 3. Moreover, the ions of the second metal contained in the solution into which the cantilever 11 is dipped may be the ions of metals other than Ag. Complex ions are included in the ions of the metal. The Fermi level of the solution containing the ions of the second metal or the chemical potential of the electrons in the solution containing the ions of the second metal is preferably lower than the Fermi level of the semiconductor constituting the cantilever 11. The Fermi levels referred to in this description respectively indicate Fermi levels before the semiconductor makes contact with a metal or a solution. What's more, although the Fermi level is a term used in semiconductor physics and the chemical potential of the electrons is a term used in solid-state physics and electrochemistry, the Fermi level of the solution containing the ions of the second metal is almost equivalent to the chemical potential of the electrons in the solution containing the ions of the second metal. Alternatively, the Fermi level of the second metal is preferably lower than the Fermi level of the semiconductor constituting the cantilever 11. Still further, it is further preferable that the Fermi level of the solution containing the ions of the second metal (or the chemical potential of the electrons) should be lower than the Fermi level of the semiconductor constituting the cantilever 11 and that the Fermi level of the second metal should be lower than the Fermi level of the semiconductor constituting the cantilever 11.

The second metal is, for example, Au (gold), platinum, iridium, palladium, copper or bismuth. In this embodiment, solutions containing the ions of these metals are used, and the structures of these metals are formed at the tip end of the needle-shaped body 13. For example, the probe 12 in which the aggregate of Au nanostructures precipitated at the tip end of the needle-shaped body 13 is manufactured using an aqueous potassium chloroaurate solution. Even in the case that the probe 12 in which the structures of Au, platinum, iridium, palladium, copper or bismuth are precipitated at the tip end of the needle-shaped body 13, tip-enhanced Raman scattering can be measured.

Embodiment 2

In Embodiment 2, the structure of the probe 12 is similar to that in Embodiment 1. As in Embodiment 1, the cantilever 11 is provided at one end of the probe holder 1, and the probe 12 is provided at the end section of the cantilever 11. The metal coat 15 is formed on the rear face of the cantilever 11. The probe 12 includes the needle-shaped body 13 protruding from the cantilever 11 and the aggregate 14 of metallic structures fixed to the tip end of the needle-shaped body 13. The metallic structures in this embodiment are Ag nanostructures. The first metal constituting the metal coat 15 is, for example, aluminum. The metal coat 15 desirably makes ohmic contact with the cantilever 11.

The probe 12 is manufactured by dipping the cantilever 11 into a solution containing the ions of the second metal. In Embodiment 2, the first metal constituting the metal coat 15 is a metal having an ionization tendency larger than that of the second metal. The Fermi level of the first metal in this embodiment may be not more than the Fermi level of the semiconductor constituting the cantilever 11 including the needle-shaped body 13. It is desirable that the cantilever 11 should be made of n-type Si and that the metal coat 15 should make ohmic contact with the cantilever 11. For example, the second metal is Ag, the first metal is aluminum, and the solution containing the ions of the second metal is the aqueous silver nitride solution 3. Aluminum has an ionization tendency larger than that of Ag. Furthermore, aluminum has a Fermi level lower than that of n-type Si. In the case that the Fermi level of the first metal is lower than the Fermi level of the semiconductor, the first metal makes Schottky contact with the semiconductor. However, in the case that the semiconductor is low-resistance highly doped n-type Si, the first metal makes ohmic contact with the semiconductor due to a quantum-mechanical tunneling phenomenon. For example, an AFM probe in which a metal coat made of metal aluminum makes ohmic contact with the cantilever made of n-type Si having a resistance of 0.01 $\Omega$cm is commercially available.

Also in this embodiment, as in Embodiment 1, the probe 12 is manufactured by dipping the cantilever 11 into the aqueous silver nitride solution 3. As shown in FIG. 3A, the cantilever 11, from the end section of which the needle-shaped body 13 protrudes, is dipped into the aqueous silver nitride solution 3. No reducing agent is contained in the aqueous silver nitrate solution 3. The cantilever 11 is dipped into the aqueous silver nitrate solution 3 so that the needle-shaped body 13 and at least part of the metal coat 15 are dipped into the aqueous silver nitrate solution 3.

The ionization tendency of the aluminum constituting the metal coat 15 is larger than the ionization tendency of Ag. Hence, the aluminum inside the metal coat 15 tends to be oxidized, and the Ag ions inside the aqueous silver nitride solution 3 tend to be reduced. When aluminum is oxidized, electrons are emitted from the aluminum. When the Ag ions are reduced, the Ag ions absorb electrons. In other words, in the case that the cantilever 11 is dipped into the aqueous silver nitride solution 3, electrons flow from the aluminum inside the metal coat 15 to the Ag ions inside the aqueous silver nitride solution 3. In the state in which the metal coat 15 makes ohmic contact with the cantilever 11, electrons are likely to flow from the metal coat 15 to the cantilever 11. Even in the case that the Fermi level of the first metal (aluminum) is not more than the Fermi level of the semiconductor (n-type Si) constituting the cantilever 11, electrons flow from the metal coat 15 to the cantilever 11 by the ohmic contact. Hence, the aluminum inside the metal coat 15 is oxidized, and electrons flow from the metal coat 15 to the cantilever 11. Moreover, electrons are most likely to flow out from the tip end of the needle-shaped body 13. As a result, electrons flow from the metal coat 15 to the cantilever 11, whereby electrons are supplied to the needle-shaped body 13 and electrons flow from the tip end of the needle-shaped body 13 into the aqueous silver nitride solution 3. The Ag ions inside the aqueous silver nitride solution 3 are reduced by the electrons having flown out. Consequently, the Ag nanostructures are precipitated and made to grow at the tip end of the needle-shaped body 13.

Since negative carriers are contained in n-type Si, in the case that the cantilever 11 is made of n-type Si, electrons are likely to move inside the cantilever 11 including the needle-shaped body 13. Electrons are likely to flow out from the tip end of the needle-shaped body 13 into the aqueous silver nitride solution 3, and the Ag nanostructures are likely to be precipitated. Hence, the cantilever 11 is desirably made of an n-type semiconductor. What's more, as the curvature of the tip end of the needle-shaped body 13 is larger, electrons are more likely to flow out from the tip end of the needle-shaped body 13.

After the cantilever 11 is dipped into the aqueous silver nitride solution 3 for an appropriate period of time, the cantilever 11 is taken out from the aqueous silver nitride solution 3 and washed. The washing, however, is not essential. As shown in FIG. 3B, the aggregate 14 of the Ag nanostructures is formed at the tip end of the needle-shaped body 13. As shown in FIGS. 3B and 3C, the probe 12 in which the aggregate 14 of the Ag nanostructures is fixed to the tip end of the needle-shaped body 13 is manufactured.

Figure 5:
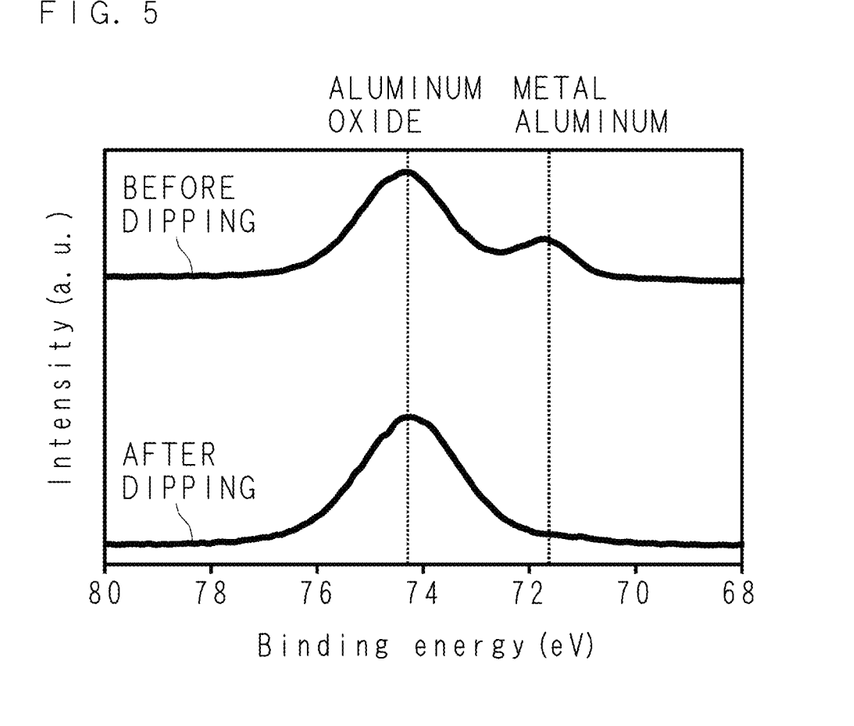
FIG. 5 is a characteristic graph indicating the analysis result of XPS for a metal coat.

FIG. 5 is a characteristic graph indicating the analysis result of XPS (X-ray Photoelectron Spectroscopy) for the metal coat 15. The horizontal axis represents binding energy, and the vertical axis represents the intensity of photoelectrons. Furthermore, the binding energy of aluminum oxide and the binding energy of metal aluminum are indicated by dotted lines. FIG. 5 shows the spectrum indicating the result of XPS conducted for the metal coat 15 before the dipping of the cantilever 11 into the aqueous silver nitride solution 3 and the spectrum indicating the result of XPS conducted for the metal coat 15 after the dipping of the cantilever 11 into the aqueous silver nitride solution 3. According to the comparison between the spectra before and after the dipping, the peak intensity of the metal aluminum decreases, and the peak intensity of the aluminum oxide increases. It is obvious that the oxidation of the aluminum inside the metal coat 15 proceeded by dipping the cantilever 11 into the aqueous silver nitride solution 3. Hence, it is assumed that the aluminum was oxidized due to the difference between the ionization tendencies of the aluminum (first metal) and the silver (second metal), that electrons flowed from the aluminum to the aqueous silver nitride solution 3 via the n-type Si constituting the cantilever 11, and that the ions of silver were reduced, whereby the Ag nanostructures were precipitated. This reaction is assumed to be represented by the following chemical reaction formula.

$$Al + 3AgNO_3 + 3H_2O \rightarrow Al(OH)_3 + 3Ag + 3HNO_3$$

The configuration of the Raman scattering measurement apparatus equipped with the probe 12 is similar to that in Embodiment 1. Also in this embodiment, the Raman scattering measurement apparatus can measure tip-enhanced Raman scattering using the probe 12 in which the aggregate 14 of the Ag nanostructures is fixed to the tip end of the needle-shaped body 13.

Figure 6:
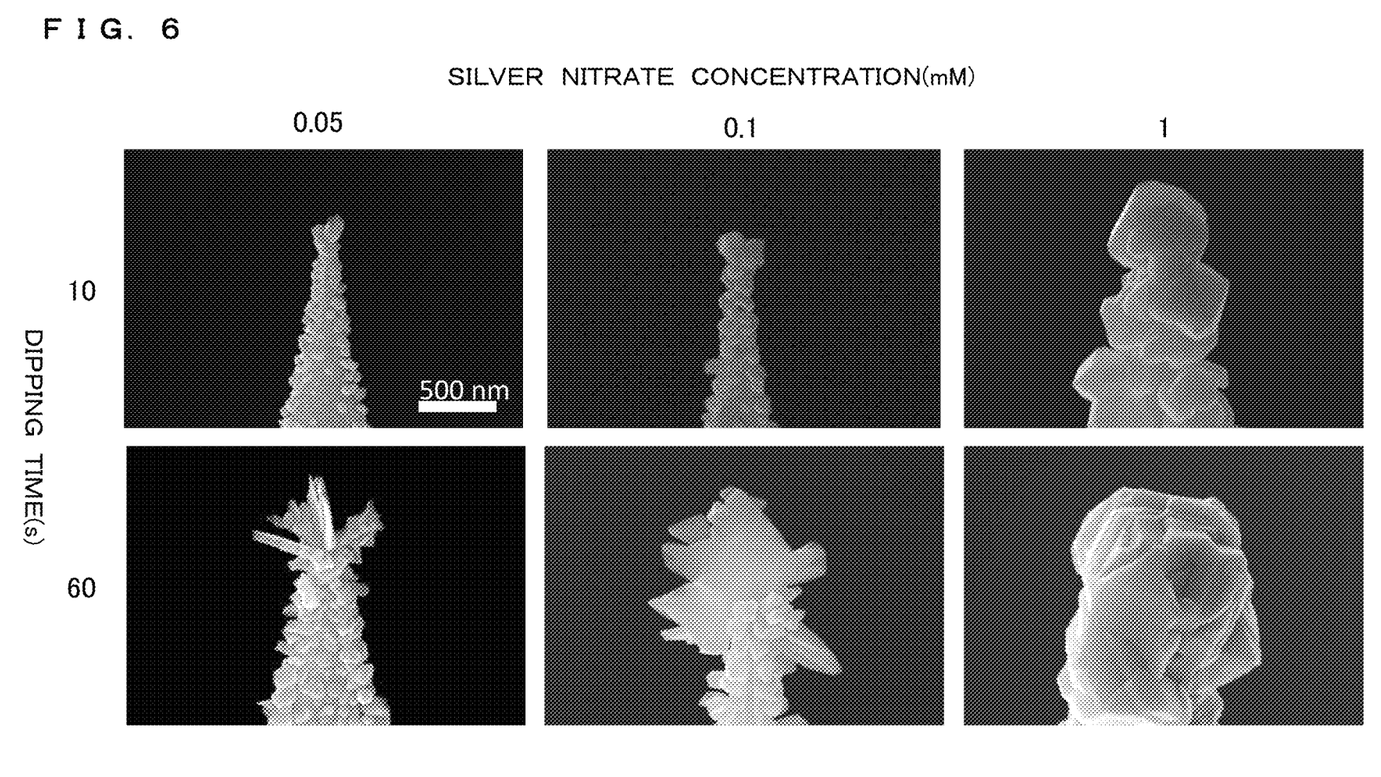
FIG. 6 is a set of photographs showing actual examples of the probe.

FIG. 6 is a set of photographs showing actual examples of the probe 12. FIG. 6 shows a plurality of photographs obtained by photographing the tip ends of the needle-shaped bodies 13 of the probes 12 having been manufactured under a plurality of conditions. As the probe holder 1 provided with the cantilever 11, OMCL-AC160TS made by Olympus was used, and each probe 12 was manufactured by dipping the cantilever 11 into the aqueous silver nitride solution 3. As the aqueous silver nitride solution 3, three kinds of solutions having silver nitrate concentrations of 0.05 mM, 0.1 mM and 1 mM were used. M herein represents mole/L. Furthermore, the dipping time during which the cantilever 11 was dipped in the aqueous silver nitride solution 3 was set to two kinds of values, 10 s and 60 s.

FIG. 6 shows six photographs arranged in two lines and three rows. The respective two photographs in the left row, the intermediate row and the right row are photographs obtained by photographing the tip ends of the needle-shaped bodies 13 of the probes 12 having been manufactured at respective silver nitrate concentrations of 0.05 mM, 0.1 mM and 1 mM. Furthermore, the respective three photographs in the upper line and the lower line are photographs obtained by photographing the tip ends of the needle-shaped bodies 13 of the probes 12 having been manufactured at respective dipping time values of 10 s and 60 s. Each photograph shows the aggregate 14 of the Ag nanostructures. As the concentration of silver nitride is higher and as the dipping time is longer, the size of the aggregate 14 of the Ag nanostructures becomes larger. Of the six probes 12 shown in FIG. 6, the aggregate 14 of the Ag nanostructures in the probe 12 having been manufactured at a silver nitrate concentration of 0.1 mM and at a dipping time value of 10 s had a size most suitable for measuring tip-enhanced Raman scattering.

Also in this embodiment, the probe 12 for tip-enhanced Raman scattering can be manufactured with little labor by dipping the cantilever 11, on the rear face of which the metal coat 15 is formed, into the aqueous silver nitride solution 3. The size and shape of the aggregate 14 of the Ag nanostructures to be formed on the probe 12 can be controlled freely by adjusting the concentration of the aqueous silver nitride solution 3 into which the cantilever 11 is dipped or by adjusting the dipping time, whereby it is possible to form the aggregate 14 suited for the wavelengths of the laser light for Raman scattering. As a result, when tip-enhanced Raman scattering is measured, effective enhancement of Raman scattering light is made possible. Furthermore, the probe 12 capable of obtaining the desired degree of enhancement at the time when tip-enhanced Raman scattering is measured can be manufactured.

The solution containing Ag ions may be solutions other than the aqueous silver nitride solution 3. The first metal constituting the metal coat 15 may be metals other than aluminum, provided that the ionization tendency of the first metal is larger than the ionization tendency of the second metal, and the ions of the second metal contained in the solution into which the cantilever 11 is dipped may be the ions of metals other than Ag. For example, the first metal may be chromium, iron, titanium, zirconium, magnesium, manganese, zinc, nickel, or tin. Moreover, for example, the second metal may be Au (gold), platinum, iridium, palladium, copper, or bismuth. Still further, the metal coat 15 may be formed at portions other than the rear face of the cantilever 11, provided that the portions are other than the portion positioned at the tip end of the needle-shaped body 13.

The Fermi level of the solution containing the ions of the second metal is preferably lower than the Fermi level of the semiconductor constituting the cantilever 11 including the needle-shaped body 13. Since the Fermi level of the solution is lower than the Fermi level of the semiconductor, electrons are likely to flow out from the tip end of the needle-shaped body 13 to the solution, and the structures of the second metal are likely to be precipitated. Furthermore, the cantilever 11 may be made of semiconductors other than an n-type Si. In the case that the cantilever 11 is made of a p-type semiconductor, the metal coat 15 makes Schottky contact with the cantilever 11. Even in the case that the cantilever 11 is made of a p-type semiconductor or an intrinsic semiconductor, electrons move inside the semiconductor, and the structures of the second metal are precipitated at the tip end of the needle-shaped body 13, whereby the probe 12 is manufactured.

Furthermore, even in the case that the entire portion of the cantilever 11 to be dipped into the solution is covered with the metal coat 15, the probe 12 is manufactured. The portion of the cantilever 11 covered with the metal coat 15 includes the tip end of the needle-shaped body 13. The ionization tendency of the first metal, such as aluminum, constituting the metal coat 15 is larger than the ionization tendency of the second metal, such as Ag. When the cantilever 11 is dipped into the solution containing the ions of the second metal, electrons flow out from the metal coat 15 to the solution. In particular, electrons are likely to flow out from the tip end of the needle-shaped body 13, and as the curvature of the tip end of the needle-shaped body 13 is larger, electrons are more likely to flow out from the tip end of the needle-shaped body 13. The structures of the second metal are precipitated at the tip end of the needle-shaped body 13, whereby the probe 12 is manufactured.

Still further, even in the case that the cantilever 11 including the needle-shaped body 13 is made of the first metal, such as aluminum, the probe 12 is manufactured. The ionization tendency of the first metal is larger than the ionization tendency of the second metal. When the cantilever 11 is dipped into the solution containing the ions of the second metal, electrons flow out from the cantilever 11 to the solution. In particular, electrons are likely to flow out from the tip end of the needle-shaped body 13, and as the curvature of the tip end of the needle-shaped body 13 is larger, electrons are more likely to flow out from the tip end of the needle-shaped body 13. The structures of the second metal are precipitated at the tip end of the needle-shaped body 13, whereby the probe 12 is manufactured.

Embodiment 3

In Embodiment 3, the metal coat 15 is not formed on the cantilever 11, and the probe 12 is provided at the end section of the cantilever 11. The probe 12 includes the needle-shaped body 13 protruding from the cantilever 11 and the aggregate 14 of metallic structures fixed to the tip end of the needle-shaped body 13. The cantilever 11 including the needle-shaped body 13 is made of an n-type Si. The metallic structures in this embodiment are Ag nanostructures.

Also in this embodiment, the probe 12 is manufactured by dipping the cantilever 11 into the aqueous silver nitride solution 3. The Fermi level of the aqueous silver nitride solution 3 is lower than the Fermi level of the n-type Si constituting the cantilever 11. The cantilever 11, from the end section of which the needle-shaped body 13 protrudes, is dipped into the aqueous silver nitride solution 3. No reducing agent is contained in the aqueous silver nitride solution 3. The cantilever 11 is dipped into the aqueous silver nitride solution 3 so that the needle-shaped body 13 is dipped into the aqueous silver nitride solution 3. Since negative carriers are contained in n-type Si, electrons are likely to move inside the cantilever 11. Furthermore, electrons are likely to flow out from the tip end of the needle-shaped body 13. As the curvature of the tip end of the needle-shaped body 13 is larger, electrons are more likely to flow out from the tip end of the needle-shaped body 13. Electrons flow through the cantilever 11 and then electrons flow out from the tip end of needle-shaped body 13 into the aqueous silver nitride solution 3. The Ag ions inside the aqueous silver nitride solution 3 are reduced by the electrons having flown out. Consequently, the Ag nanostructures are precipitated and made to grow at the tip end of the needle-shaped body 13.

After the cantilever 11 is dipped into the aqueous silver nitride solution 3 for an appropriate period of time, the cantilever 11 is taken out from the aqueous silver nitride solution 3 and washed. The washing, however, is not essential. The aggregate 14 of the Ag nanostructures is formed at the tip end of the needle-shaped body 13. The probe 12 in which the aggregate 14 of the Ag nanostructures is fixed to the tip end of the needle-shaped body 13 is manufactured although the dipping time is required to be longer than in Embodiments 1 and 2. For example, it is confirmed that, in the case that a commercially available AFM probe made of an n-type Si having a resistance of 0.01 to 0.02 Ωcm and not having the metal coat 15 was used as the cantilever 11, the probe 12 having the aggregate 14 of the Ag nanostructures was manufactured. Even in the case that the probe 12 manufactured by the manufacturing method according to this embodiment is used, the Raman scattering measurement apparatus can measure tip-enhanced Raman scattering.

Figure 7:
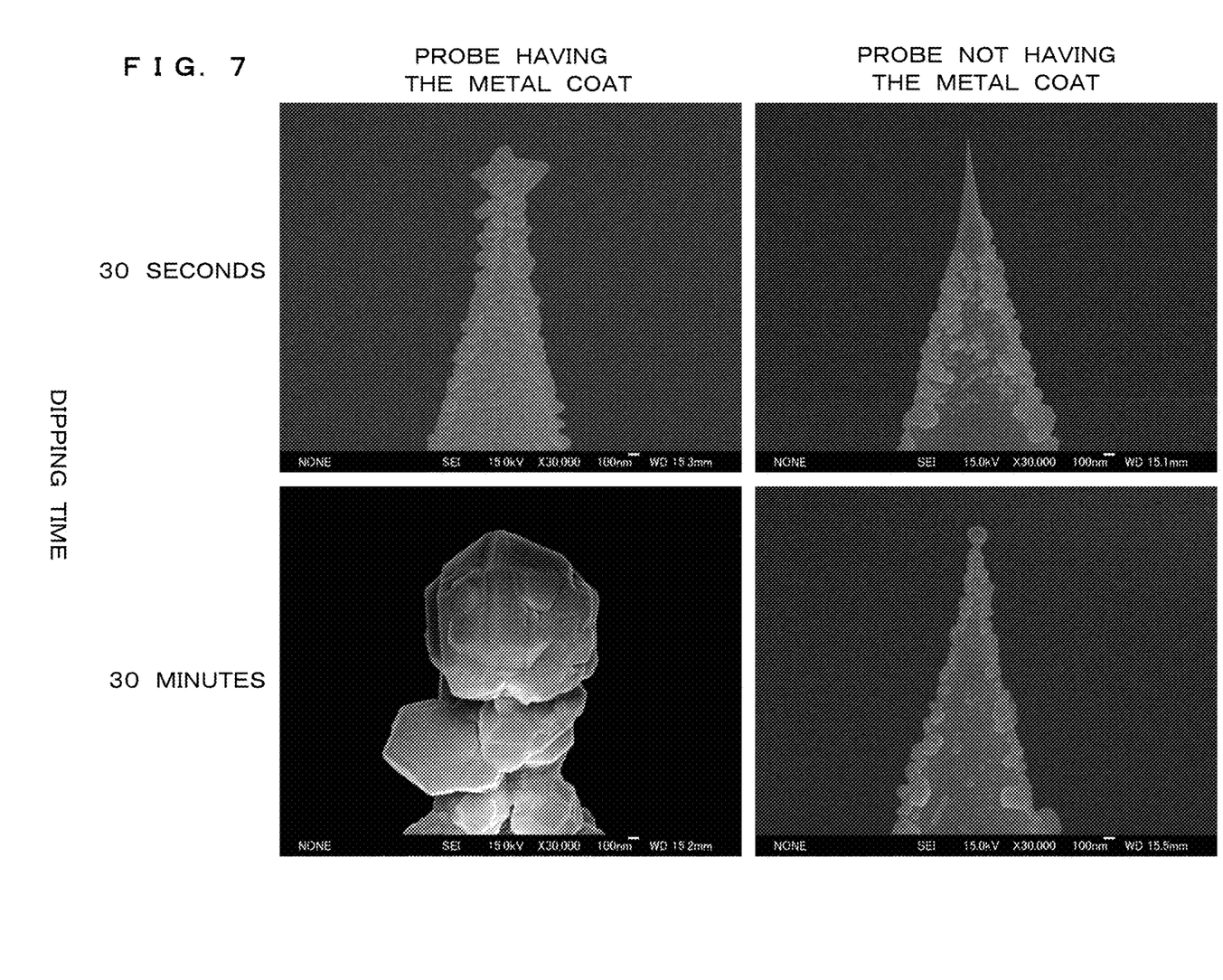
FIG. 7 is a set of photographs showing actual examples of the probe having the metal coat formed on a cantilever and the probe not having the metal coat.

FIG. 7 is a set of photographs showing actual examples of the probe 12 having the metal coat 15 formed on the cantilever 11 and the probe 12 not having the metal coat 15. FIG. 7 shows a plurality of photographs obtained by photographing the tip end of the probe 12 manufactured using the cantilever 11 having the metal coat 15 as in Embodiment 2, and by photographing the tip end of the probe 12 manufactured using the cantilever 11 not having the metal coat 15. As the probe holder 1 provided with the cantilever 11 having the metal coat 15 formed thereon, the OMCL-AC160TS made by Olympus was used, and as the probe holder 1 provided with the cantilever 11 not having the metal coat 15, the OMCL-AC160TN made by Olympus was used. The probes 12 were manufactured by dipping the cantilever 11 into the aqueous silver nitride solution 3. The silver nitrate concentration of the aqueous silver nitride solution 3 was set to 0.1 mM. Furthermore, the dipping time during which the cantilever 11 was dipped in the aqueous silver nitride solution was set to two kinds of values, 30 seconds and 30 minutes.

FIG. 7 shows four photographs arranged in two lines and two rows. The two photographs in the left row are photographs obtained by photographing the tip ends of the needle-shaped bodies 13 of the probes 12 having been manufactured using the cantilevers 11 having the metal coat 15 formed thereon. The two photographs in the right row are photographs obtained by photographing the tip ends of the needle-shaped bodies 13 of the probes 12 having been manufactured using the cantilevers 11 not having the metal coat 15. The probes 12 shown in the photographs in the right row are the probes 12 manufactured by the manufacturing method according to this embodiment. Furthermore, the respective two photographs in the upper line and the lower line are photographs obtained by photographing the tip ends of the needle-shaped bodies 13 of the probes 12 having been manufactured at dipping time values of 30 seconds and 30 minutes, respectively. Each photograph shows the aggregate 14 of the Ag nanostructures. In comparison with the probe 12 of the cantilever 11 having the metal coat 15 formed thereon, in the probe 12 of the cantilever 11 not having the metal coat 15, the size of the aggregate 14 of the Ag nanostructures is smaller even though the dipping time is the same. As shown in FIG. 7, as the dipping time is made longer, the aggregate 14 of the Ag nanostructures is made to grow further. Also in this embodiment, it is obvious that the probe 12 containing the aggregate 14 of the Ag nanostructures having a sufficiently large size can be manufactured by making the dipping time sufficiently long.

Also in this embodiment, the probe 12 for tip-enhanced Raman scattering can be manufactured with little labor by dipping the cantilever 11 into the aqueous silver nitride solution 3. The size and shape of the aggregate 14 of the Ag nanostructures to be formed on the probe 12 can be controlled freely by adjusting the concentration of the aqueous silver nitride solution 3 into which the cantilever 11 is dipped or by adjusting the dipping time, whereby it is possible to form the aggregate 14 suited for the wavelengths of the laser light for Raman scattering. As a result, when tip-enhanced Raman scattering is measured, effective enhancement of Raman scattering light is made possible. Furthermore, the probe 12 capable of obtaining the desired degree of enhancement at the time when tip-enhanced Raman scattering is measured can be manufactured.

As in Embodiment 1 or 2, the solution containing Ag ions may be solutions other than the aqueous silver nitride solution 3. The ions of the second metal contained in the solution into which the cantilever 11 is dipped may be ions of metals other than Ag. For example, the second metal may be Au (gold), platinum, iridium, palladium, copper, or bismuth. The Fermi level of the solution containing the ions of the second metal or the chemical potential of the electrons in the solution containing the ions of the second metal is preferably lower than the Fermi level of the semiconductor constituting the cantilever 11 including the needle-shaped body 13. Furthermore, the cantilever 11 may be made of semiconductors other than an n-type Si. Even in the case that the cantilever 11 is made of a p-type semiconductor or an intrinsic semiconductor, thermally excited electrons move inside the semiconductor, the structures of the second metal are precipitated at the tip end of the needle-shaped body 13, whereby the probe 12 is manufactured.

Embodiment 4

Figure 8A:
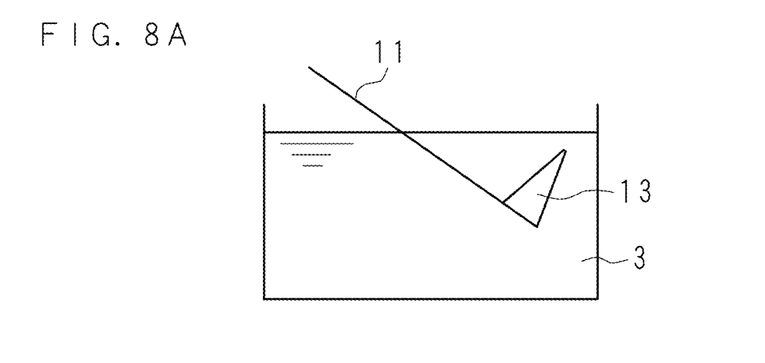
FIG. 8A is a schematic view showing a method for manufacturing a probe according to Embodiment 4.
Figures 8B, 8C:
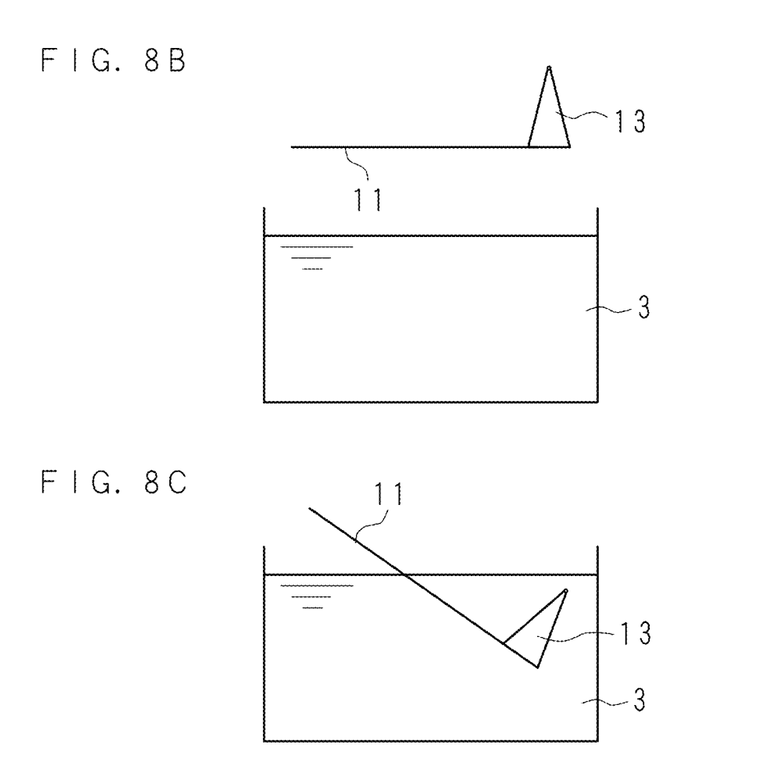
FIG. 8B is a schematic view showing a method for manufacturing the probe according to Embodiment 4.
FIG. 8C is a schematic view showing a method for manufacturing the probe according to Embodiment 4.
Figure 8D:
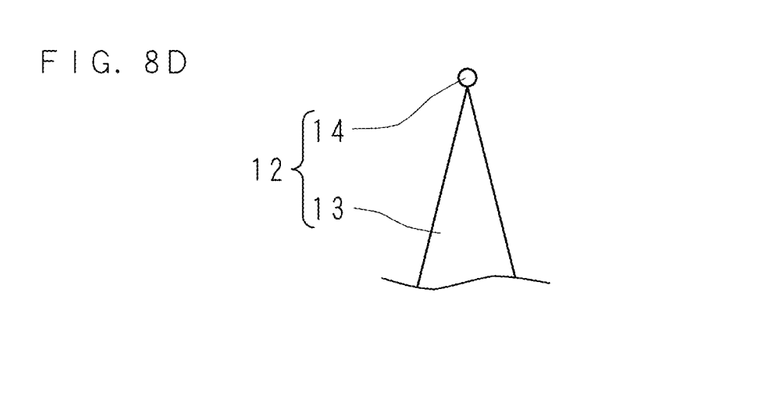
FIG. 8D is a schematic view showing a method for manufacturing the probe according to Embodiment 4.

FIGS. 8A, 8B, 8C and 8D are schematic views showing a method for manufacturing the probe 12 according to Embodiment 4. The configuration of the probe 12 to be manufactured by the manufacturing method according to Embodiment 4 is similar to the configuration according to Embodiment 1, 2 or 3. As shown in FIG. 8A, the cantilever 11 similar to those according to Embodiments 1 to 3 is dipped into the aqueous silver nitride solution 3. Ag is precipitated at the tip end of the needle-shaped body 13 and the seed of the Ag nanostructures is formed. After the cantilever 11 is dipped into the aqueous silver nitride solution 3 for a certain period of time, the cantilever 11 is pulled out from the aqueous silver nitride solution 3, and the needle-shaped body 13 is washed and dried as shown in FIG. 8B. After the drying, the cantilever 11 is dipped into the aqueous silver nitride solution 3 again as shown in FIG. 8C. The Ag nanostructures are made to grow from the seed of the Ag nanostructures having been formed at the tip end of the needle-shaped body 13. After the cantilever 11 is dipped into the aqueous silver nitride solution 3 for an appropriate period of time, the cantilever 11 is taken out from the aqueous silver nitride solution 3. The probe 12 for tip-enhanced Raman scattering in which the aggregate 14 of the Ag nanostructures is fixed to the tip end of the needle-shaped body 13 is manufactured as shown in FIG. 8D. The configuration of the Raman scattering measurement apparatus equipped with the probe 12 is similar to that in Embodiment 1.

As described above, in this embodiment, the probe 12 for tip-enhanced Raman scattering is manufactured by dipping the cantilever 11 into the aqueous silver nitride solution 3, by drying the needle-shaped body 13 once, and by dipping the cantilever 11 into the aqueous silver nitride solution 3 again. In comparison with the case in which the cantilever 11 is dipped into the aqueous silver nitride solution 3 only once as in Embodiments 1 to 3, the aggregate 14 of the Ag nanostructures having a sharper or larger shape is obtained in some cases. Hence, the aggregate 14 of the Ag nanostructures can be made to grow further, and the probe 12 capable of obtaining the desired degree of enhancement at the time when tip-enhanced Raman scattering is measured can be manufactured.

As in Embodiments 1 to 3, the solution containing Ag ions may be solutions other than the aqueous silver nitride solution 3. The ions of the second metal contained in the solution into which the cantilever 11 is dipped may be ions of metals other than Ag. For example, the second metal may be Au (gold), platinum, iridium, palladium, copper, or bismuth. The solution into which the cantilever 11 is dipped first may be different from the solution into which the cantilever 11 is dipped again.

A manufacturing kit for manufacturing the probe 12 can be used to execute the method for manufacturing the probes 12 according to Embodiments 1 to 4. The manufacturing kit includes the cantilever 11 and a solution such as the aqueous silver nitride solution 3 containing the ions of the second metal. The cantilever 11 included in the manufacturing kit is provided on the probe holder 1, and the metal coat 15 may be formed on the cantilever 11 or may not be formed. The solution included in the manufacturing kit may be used as the raw solution or may be diluted and used. The user can manufacture the probe 12 by dipping the cantilever 11 included in the manufacturing kit into the solution included in the manufacturing kit for an appropriate period of time. The cantilever 11 may not be included in the manufacturing kit. The user can manufacture the probe 12 using, for example, a commercially-available general-purpose cantilever 11 and the solution included in the manufacturing kit.

Embodiment 5

In the case that the probe 12 having been manufactured by the manufacturing methods according to Embodiments 1 to 4 is used continuously to measure tip-enhanced Raman scattering, the probe 12 is degraded by the deformation, oxidation or sulfurization of the aggregate 14 of metallic structures fixed to the tip end of the needle-shaped body 13. Furthermore, the probe 12 is also degraded in the case that substances other than the aggregate 14 of metallic structures adhere to the aggregate. For example, when the probe 12 is exposed to the atmosphere, the substances in the atmosphere are adsorbed by the aggregate 14 of metallic structures. Moreover, even if the probe 12 is not used, the probe 12 is also degraded during its storage period. In the case that the probe 12 is degraded, the enhancement of Raman scattering light becomes insufficient when tip-enhanced Raman scattering is measured. In Embodiment 5, a reconditioned probe 12 is manufactured from a degraded probe 12.

In this embodiment, the probe 12 is reconditioned by removing part of the aggregate 14 of metallic structures from the degraded probe 12, by reducing the aggregate 14 of metallic structures or by removing substances adhered to aggregate 14 of metallic structures. The removal of part of the aggregate 14 of metallic structures and the removal of the adhered substances are executed by applying short-wavelength light, such as ultraviolet light, to the tip end of the needle-shaped body 13. Part of the aggregate 14 of metallic structures or the substances adhered to the aggregate 14 of metallic structures are removed from the needle-shaped body 13 by applying the short-wavelength light. Alternatively, a stripping solution is used to remove part of the aggregate 14 of metallic structures and to remove the adhered substances. Part of the aggregate 14 of metallic structures and the substances adhered to the aggregate 14 of metallic structures are removed from the probe 12 by dipping the probe 12 into a stripping solution, such as hydrochloric acid, sulfuric acid, nitric acid, acetic acid, thio nitric acid, etc. The degraded probe is reconditioned by removing degraded part of the aggregate 14 of metallic structures. Similarly, the degraded probe is reconditioned by removing the substances adhered to the aggregate 14 of metallic structures. As described above, a reconditioned probe 12 is manufactured. The reconditioned probe 12 may be manufactured by executing any one of the manufacturing methods according to Embodiments 1 to 4 using the cantilever 11 from which part or whole of the aggregate 14 of metallic structures has been removed from the needle-shaped body 13.

The reduction of the aggregate 14 of the metallic structures is performed by heating or a method in which a reducing agent is used. Part of the aggregate 14 of metallic structures is reduced by dipping the probe 12 into a solution in which a reducing agent, such as $NaBH_4$, is used as a solute. The degraded probe 12 is reconditioned by reducing oxidized part of the aggregate 14 of metallic structures. In this way, the reconditioned probe 12 is manufactured.

Also in this embodiment, the measurement of tip-enhanced Raman scattering can be made using the manufactured probe 12. With this embodiment, even if the probe 12 is degraded, the probe 12 can be reconditioned so that the desired degree of enhancement is obtained at the time when tip-enhanced Raman scattering is measured. Furthermore, with this embodiment, the cantilever 11 can be recycled.

The manufacturing kit for manufacturing the probe 12 can be used to execute the method for manufacturing the probe 12 according to the embodiment. The manufacturing kit includes the cantilever 11, a solution such as the aqueous silver nitride solution 3 containing the ions of the second metal, and a reconditioning liquid for reconditioning the probe 12. The metal coat 15 may be formed on the cantilever 11, or may not be formed. The reconditioning liquid is a stripping solution, such as hydrochloric acid, sulfuric acid, nitric acid, acetic acid, thio nitric acid, etc. or a solution in which a reducing agent, such as $NaBH_4$, is used as a solute. Each of the solution and the reconditioning liquid included in the manufacturing kit may be used as the raw solution or may be diluted and used. The user can manufacture the probe 12 by dipping the cantilever 11 included in the manufacturing kit into the solution included in the manufacturing kit. Furthermore, the user can manufacture a reconditioned probe 12 by dipping a used probe 12 into the reconditioning liquid for an appropriate period of time. The cantilever 11 may not be included in the manufacturing kit.

Although it is assumed that the solution containing the ions of the second metal is an aqueous solution in Embodiments 1 to 5 described above, the solution containing the ions of the second metal into which the cantilever 11 is to be dipped may be a solution in which a solvent other than water, such as an organic solvent, is used.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A method for manufacturing a probe protruding from a cantilever, comprising the step of:
    dipping the cantilever made of a semiconductor, the cantilever being a coated cantilever having a part coated with a first metal and having another part from which a needle-shaped body protrudes, into a solution containing ions of a second metal, to manufacture the probe in which structures of the second metal are precipitated at a tip end of the needle-shaped body, wherein
    a Fermi level of the first metal is higher than a Fermi level of the semiconductor.

2. The method for manufacturing the probe according to claim 1, wherein
    the first metal is one of aluminum, chromium, iron, titanium, zirconium, magnesium, manganese, zinc, nickel, or tin.

3. The method for manufacturing the probe according to claim 1, wherein
    after the cantilever is dipped into the solution, the dipping is interrupted, the needle-shaped body is dried, and the cantilever is dipped into the solution again.

4. The method for manufacturing the probe according to claim 1, wherein
    the solution is a solution containing ions of one of silver, gold, platinum, iridium, palladium, copper or bismuth.

5. The method for manufacturing the probe according to claim 1, further comprising the step of:
    removing part of the structures contained in a degraded probe, reducing the structures or removing substances adhered to the structures.

6. A method for manufacturing a probe protruding from a cantilever, comprising the step of:
    dipping the cantilever made of a semiconductor, the cantilever having a part from which a needle-shaped body protrudes and having or not having another part coated with a first metal, into a solution containing ions of a second metal, thereby supplying electrons from the needle-shaped body to the ions of the second metal in the solution and manufacturing the probe in which structures of the second metal are precipitated at a tip end of the needle-shaped body, wherein
    a Fermi level of the solution is lower than a Fermi level of the semiconductor.

7. The method for manufacturing the probe according to claim 6, wherein
    the cantilever is a coated cantilever and includes the another part, which is coated with a metal coat made of the first metal.

8. The method for manufacturing the probe according to claim 7, wherein
    the first metal is a metal having an ionization tendency larger than that of the second metal.

9. The method for manufacturing the probe according to claim 7, wherein
    the metal coat makes ohmic contact with the cantilever.

10. The method for manufacturing the probe according to claim 7, wherein
    the first metal is one of aluminum, chromium, iron, titanium, zirconium, magnesium, manganese, zinc, nickel, or tin.

11. The method for manufacturing the probe according to claim 6, wherein
    after the cantilever is dipped into the solution, the dipping is interrupted, the needle-shaped body is dried, and the cantilever is dipped into the solution again.

12. The method for manufacturing the probe according to claim 6, wherein
    the solution is a solution containing ions of one of silver, gold, platinum, iridium, palladium, copper or bismuth.

13. The method for manufacturing the probe according to claim 6, further comprising the step of:
    removing part of the structures contained in a degraded probe, reducing the structures or removing substances adhered to the structures.

14. A probe protruding from a cantilever, comprising:
    a needle-shaped body protruding from a part of the cantilever, wherein the cantilever is a coated cantilever made of a semiconductor and another part of the cantilever is coated with a first metal; and
    an aggregate of a second metal precipitated at a tip end of the needle-shaped body by dipping the cantilever into a solution containing ions of the second metal, wherein
    a Fermi level of the first metal is higher than a Fermi level of the semiconductor.

15. A probe protruding from a cantilever, comprising:
    a needle-shaped body protruding from a part of the cantilever made of a semiconductor, the cantilever having or not having another part coated with a first metal; and
    an aggregate of a second metal precipitated at a tip end of the needle-shaped body by dipping the cantilever into a solution containing ions of the second metal, wherein
    a Fermi level of the solution is lower than a Fermi level of the semiconductor.

* * * * *